(12) United States Patent
Raffesberger

(10) Patent No.: US 7,455,058 B2
(45) Date of Patent: Nov. 25, 2008

(54) METHOD AND APPARATUS FOR CONTROLLING STATIONARY GASEOUS-FUELED INTERNAL COMBUSTION ENGINES

(75) Inventor: Raymond A. Raffesberger, 1364 Corvidae St., Carlsbad, CA (US) 92011

(73) Assignee: Raymond A. Raffesberger, Carlsbad, CA (US)

( * ) Notice: Subject to any disclaimer, the term of this patent is extended or adjusted under 35 U.S.C. 154(b) by 0 days.

(21) Appl. No.: 11/486,719

(22) Filed: Jul. 14, 2006

(65) Prior Publication Data

US 2007/0089719 A1    Apr. 26, 2007

Related U.S. Application Data

(60) Provisional application No. 60/719,093, filed on Oct. 26, 2005.

(51) Int. Cl.
  *F02D 41/00*    (2006.01)
(52) U.S. Cl. .................. 123/694; 123/696; 123/672; 701/109
(58) Field of Classification Search ............ 123/527, 123/672, 694, 703; 701/109
  See application file for complete search history.

(56) References Cited

U.S. PATENT DOCUMENTS

| | | | | |
|---|---|---|---|---|
| 3,895,611 A * | 7/1975 | Endo at al. ................ 123/694 |
| 4,250,856 A * | 2/1981 | Abbey ..................... 123/439 |
| 4,364,364 A * | 12/1982 | Subramaniam ............. 123/527 |
| 4,625,698 A * | 12/1986 | Jamrog ..................... 123/696 |
| 4,843,558 A * | 6/1989 | Bergmann et al. .......... 123/527 |
| 5,243,954 A * | 9/1993 | Moss ....................... 123/688 |
| 5,390,651 A * | 2/1995 | Nussbaum et al. ......... 123/694 |
| 5,533,492 A * | 7/1996 | Willey et al. .............. 123/681 |
| 5,542,392 A * | 8/1996 | Povinger ................... 123/480 |
| 5,614,658 A * | 3/1997 | Moss ........................ 60/286 |
| 5,615,655 A * | 4/1997 | Shimizu .................... 123/527 |
| 5,735,245 A * | 4/1998 | Kubesh et al. ............. 123/676 |
| 6,151,547 A * | 11/2000 | Kumar et al. .............. 701/101 |
| 6,371,092 B1 * | 4/2002 | Guglielmo et al. ......... 123/527 |
| 6,687,597 B2 * | 2/2004 | Sulatisky et al. ........... 701/104 |
| 6,701,905 B1 * | 3/2004 | Gaskins ..................... 123/674 |
| 6,901,889 B1 * | 6/2005 | Ritter et al. ................ 123/672 |
| 2004/0083715 A1 * | 5/2004 | Le Leux et al. ............. 60/280 |
| 2004/0089279 A1 * | 5/2004 | McLaughlin et al. ....... 123/688 |
| 2006/0180128 A1 * | 8/2006 | Saito et al. ................. 123/525 |

* cited by examiner

*Primary Examiner*—Stephen K Cronin
*Assistant Examiner*—J. Page Hufty
(74) *Attorney, Agent, or Firm*—Bernard L. Kleinke; Duckor Spradling Metzger & Wynne

(57) ABSTRACT

A method and system is disclosed which relates to controlling a stationary gaseous-fueled internal combustion engine. The method may include measuring an air to fuel ratio of the engine, calculating a difference between the measured air to fuel ratio and a desired air to fuel ratio for the engine, and automatically controlling an air to fuel mixture supplied to the engine in accordance with the calculated difference to enable the engine to run at substantially the desired air to fuel ratio.

18 Claims, 14 Drawing Sheets

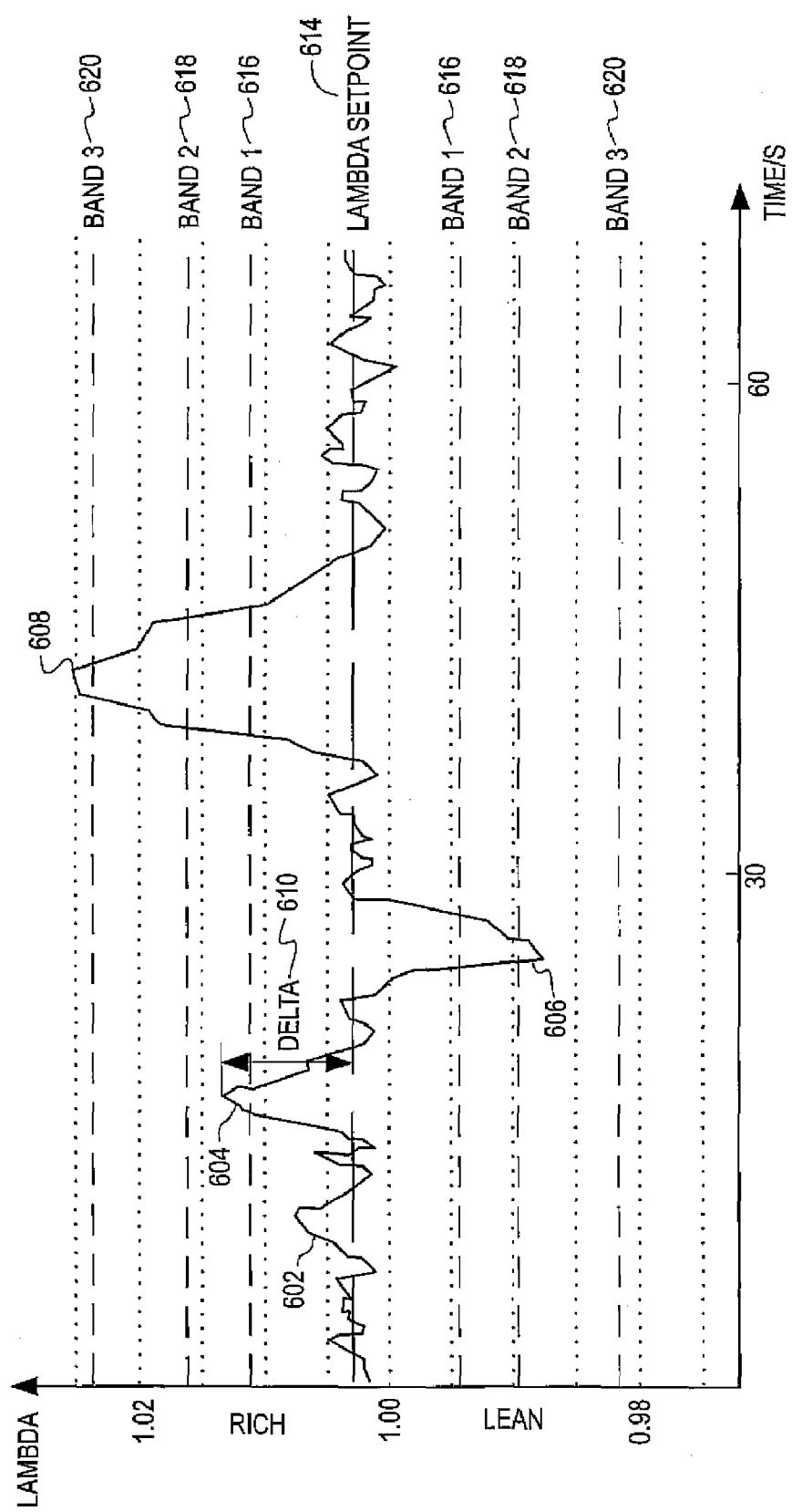

NARROWBAND OUTPUT (AIR/FUEL RATIO VS. VOLTAGE)

WIDEBAND LINEAR OUTPUT (AIR/FUEL RATIO VS. VOLTAGE)

METHOD AND APPARATUS FOR CONTROLLING STATIONARY GASEOUS-FUELED INTERNAL COMBUSTION ENGINES

RELATED APPLICATION

This application claims priority to U.S. provisional patent application, entitled LAMBDA MANAGEMENT SYSTEM, Application No. 60/719,093, filed Oct. 26, 2005, and incorporates it herein by reference.

FIELD OF THE INVENTION

The present invention relates generally to a method and apparatus for air/fuel ratio control for stationary gaseous-fueled internal combustion engines. More specifically it relates to a method and apparatus for controlling in a more efficient and effective manner the air/fuel ratio of a stationary gaseous-fueled internal combustion engine to facilitate more complete combustion and thereby reducing unwanted and undesirable emissions.

BACKGROUND OF THE INVENTION

Stationary gaseous-fueled internal combustion engines are commonly used throughout the world. These engines are typically powered by natural gas, methane, propane, or other suitable gaseous fuel. While these engines can be used in a multitude of applications, one typical use is in an agricultural setting having little or no access to electrical power at the growing fields. For example, powering irrigation pumps is a common use for these engines.

Emissions from these stationary gaseous-fueled internal combustion engines are a growing concern with stricter emission requirements being enacted for air pollution control. These engines may be periodically checked for compliance of the emission standards by an independent tester. One method of controlling the emissions of such engines is to control the air/fuel ratio of the engine.

It can be appreciated that air/fuel ratio controllers for stationary gaseous-fueled internal combustion engines have been in use for years. Some typical air/fuel ratio controllers are those described in U.S. Pat. No. 6,752,135 to Woodward Controls Corp. and U.S. Pat. No. 5,322,047 to Dynalco Controls Inc. While these devices may be suitable for the particular purpose to which they address, they are not as suitable for controlling the air/fuel ratio, i.e. lambda (refers to the amount of excess oxygen in the exhaust stream of an internal combustion engine) over a wide range of applications and not suitable to meet modern emission standards.

The system of U.S. Pat. No. 6,752,135 operates with a pressure regulator set to run at the lean limit and adding in a supplemental fuel flow through a small valve. The fuel added is modulated by a controller that uses an oxygen sensor in an attempt to maintain the correct mixture. The system has a limited range of operation and will not accommodate changes in the heating value of the gas as required by some applications. Since the system is already being run at the lean limit, if either the load is reduced dramatically or the heating value of the gas increases, the system will not be able to maintain compliance.

The system of U.S. Pat. No. 5,322,047 operates with a bias pressure applied to the back side of the pressure regulator, which is controlled by an electronic circuit and a current to pressure (I to P) transmitter. This system does not respond immediately when the load changes. It must wait until the oxygen sensor responds and also deal with the lag of the I to P transmitter.

These conventional air/fuel ratio controllers for stationary engines and others on the market typically use a heated exhaust gas oxygen (HEGO) sensor. As shown in FIG. 8, the HEGO sensor operates in only a very narrow range to switch between lean and rich, and thus only provides a rich or lean indication. For example, a HEGO sensor may operate with a 0 to 1 volt dc output with a stoichiometric air/fuel ratio at about 450 mV. The stoichiometric air/fuel ratio is the air/fuel ratio that is theoretically necessary for complete combustion. An engine's emissions are theoretically at their lowest at the stoichiometric air/fuel ratio, when used in conjunction with a catalytic converter.

For example, an output voltage of the HEGO sensor above 450 mV indicates a rich fuel mixture, and an output voltage of the HEGO sensor below 450 mV indicates a lean fuel mixture. However, small changes in the air/fuel ratio can cause the output voltage of the HEGO sensor to change abruptly above or below the 450 mV level. Plus, a difference of only 20 mV above or below 450 mV may be the difference between the engine running properly or not. Engine emissions are higher when the engine is run rich or lean.

Every time the HEGO sensor's output voltage transitions abruptly above or below this 450 mV level, the conventional air/fuel ratio controller responds by decreasing or increasing the amount of fuel provided to the engine. This controlling of the air/fuel ratio of the engine between rich and lean allows the controller to maintain a somewhat average air/fuel mixture, but the engine still exhibits increased emissions in these rich and lean conditions. While adequate in the past, this approach may not enable the engine to meet the latest emissions requirements for stationary gaseous-fueled internal combustion engines.

Also the HEGO may not operate satisfactorily in a lean burn application, limiting its usage. Another problem with conventional air/fuel ratio controllers are some systems may require the use of an outside source of pressure, either unregulated natural gas, which is very dangerous, or compressed air, which adds to the overall cost and complexity of the system. Still another problem with conventional air/fuel ratio controllers is that the software programs or human machine interface (HMI), may be very complicated and difficult to understand by all but the most astute in the art in at least some circumstances.

BRIEF DESCRIPTION OF THE DRAWINGS

The features of this invention and the manner of attaining them will become apparent, and the invention will be best understood by reference to the following description of certain embodiments of the invention taken in conjunction with the accompanying drawings, wherein:

FIG. 6 is a control diagram showing various conditions of the air/fuel mixture;

DETAILED DESCRIPTION OF CERTAIN EMBODIMENTS OF THE INVENTION

Figure 1:
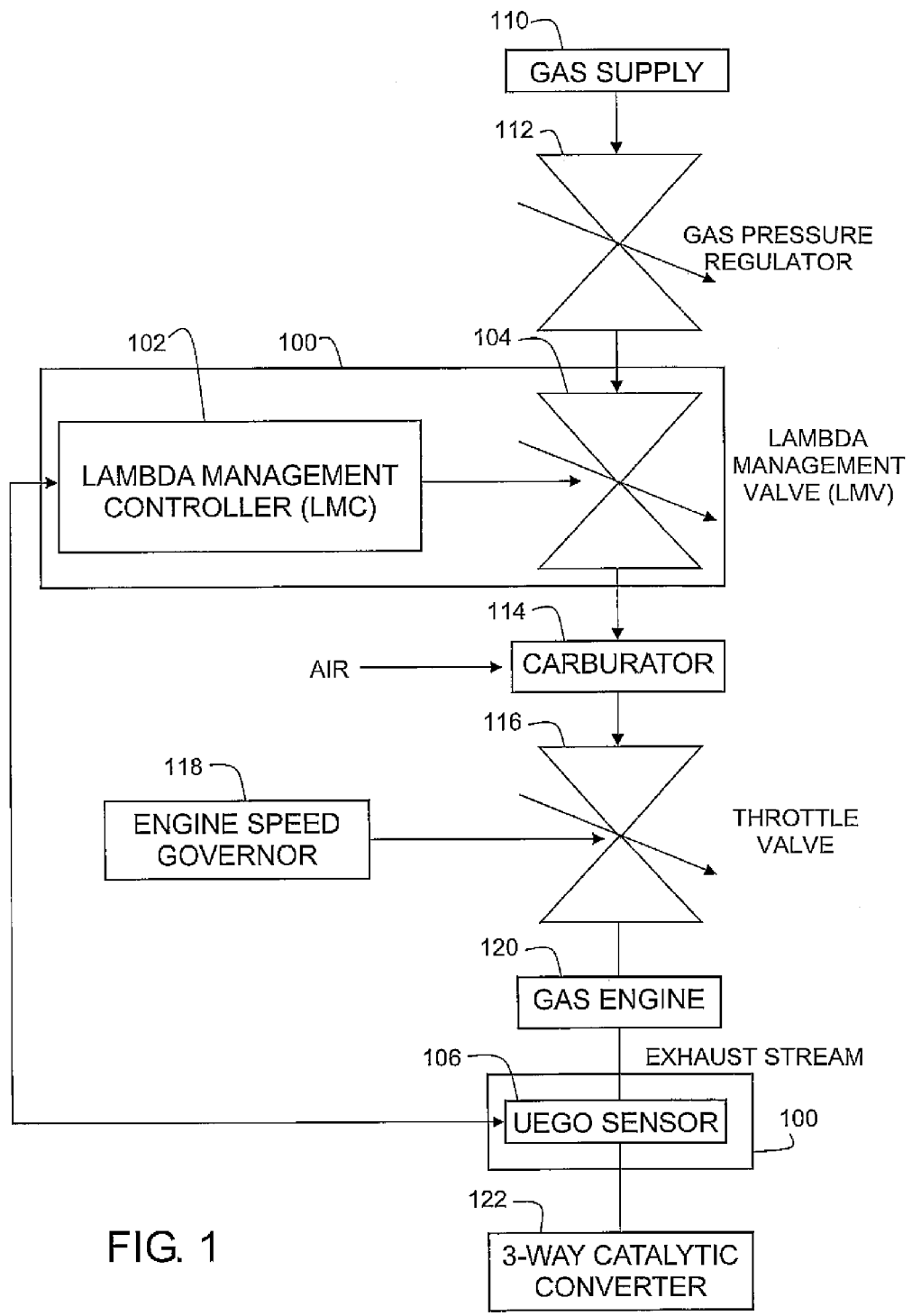
FIG. 1 is a block diagram of an embodiment of a lambda management system installed on an engine in accordance with the present invention.

It will become readily understood that the components of the embodiments as generally described and illustrated in the drawings herein, could be arranged and designed in a wide variety of different configurations. Thus, the following more detailed description of the embodiments of the system, components and method of the present invention, as represented in the drawings, is not intended to limit the scope of the invention, as claimed, but is merely representative of certain embodiments of the invention.

According to certain embodiments of the invention, there is provided a method and system of controlling a stationary gaseous-fueled internal combustion engine. The method may include measuring an air to fuel ratio of the engine, calculating a difference between the measured air to fuel ratio and a desired air to fuel ratio for the engine, and automatically controlling an air to fuel mixture supplied to the engine in accordance with the calculated difference to enable the engine to run at substantially the desired air to fuel ratio.

According to another embodiment of the present invention, there is a method of controlling a stationary gaseous-fueled internal combustion engine. The method may include measuring an air to fuel ratio of the engine, calculating a lambda value using the measured air to fuel ratio, calculating a difference between the calculated lambda value and a lambda set point for the engine, and automatically controlling an air to fuel mixture supplied to the engine in accordance with the calculated difference to enable the engine to run at substantially the desired air to fuel ratio.

Referring to FIG. 1 of the drawings, there is shown a block diagram of an embodiment of a lambda management system 100 installed on an engine system. The lambda management system 100 may include a lambda management controller (LMC) 102, a lambda management valve (LMV) 104, and a universal exhaust gas oxygen (UEGO) sensor 106. The engine system may include a gas supply 110, a gas pressure regulator 112, a carburetor 114, a throttle valve 116 controlled by an engine speed governor 118, a gas engine 120, and a 3-way catalytic converter 122. The lambda management valve 104 may be installed between the gas pressure regulator 112 and the carburetor 114, and the UEGO sensor 106 may be installed in the gas stream between the gas engine 120 and the 3-way non-selective catalytic converter 122.

The universal exhaust gas oxygen (UEGO) sensor 106 may also be referred to as a wideband oxygen sensor. These sensors are commonly used in the automotive industry and sense the amount of oxygen in the exhaust gas by way of a pumping cell internal to the unit. The pumping cell transfers the oxygen content into a signal that may be read by an interface circuit.

The catalytic converter 122 may be able to reduce the hydrocarbon (HC), carbon monoxide (CO), and nitrogen oxides (NOx) emissions by more than 98% provided the engine operates within a very narrow scatter range centered around the stoichiometric air/fuel ratio. The lambda management system 100 may control the engine to operate at or very near the stoichiometric air/fuel ratio. Therefore, the lambda management system 100 used with a 3-way non-selective catalytic converter may greatly reduce the emissions of HC, CO, and NOx from a stationary gaseous-fueled internal combustion engine.

Figure 2:
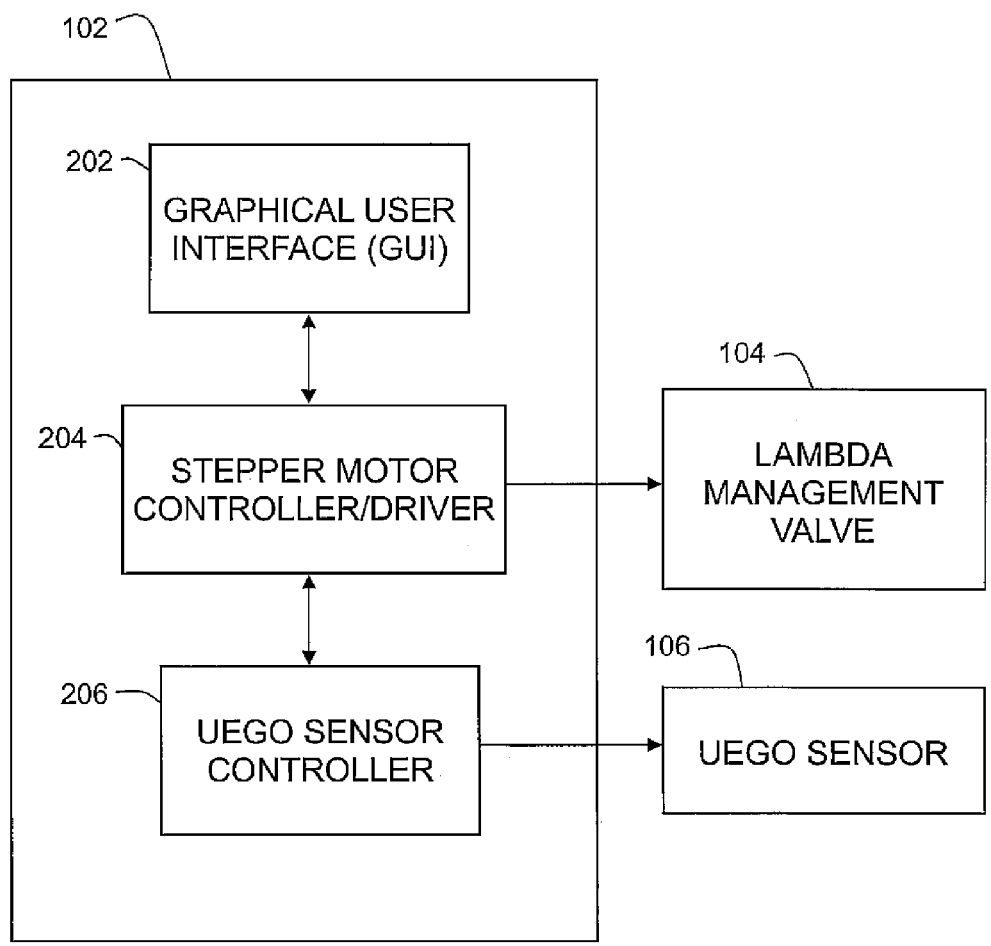
FIG. 2 is a block diagram of the lambda management system of FIG. 1 with the lambda management controller shown in greater detail.
Figure 10:
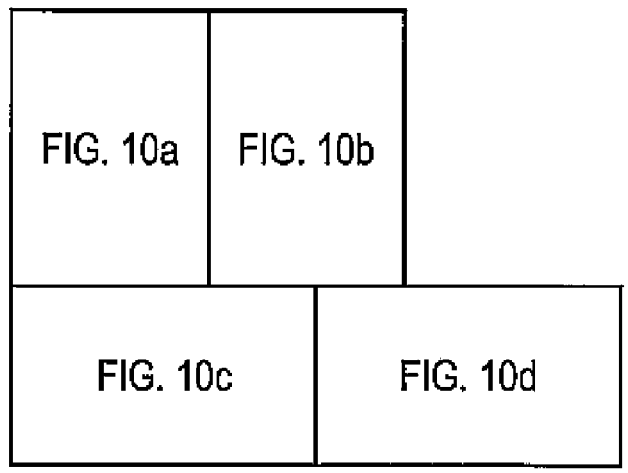
FIGS. 10A through 10D when arranged as shown in FIG. 10 is a schematic diagram of the lambda management system of FIG. 2.
Figure 10A:
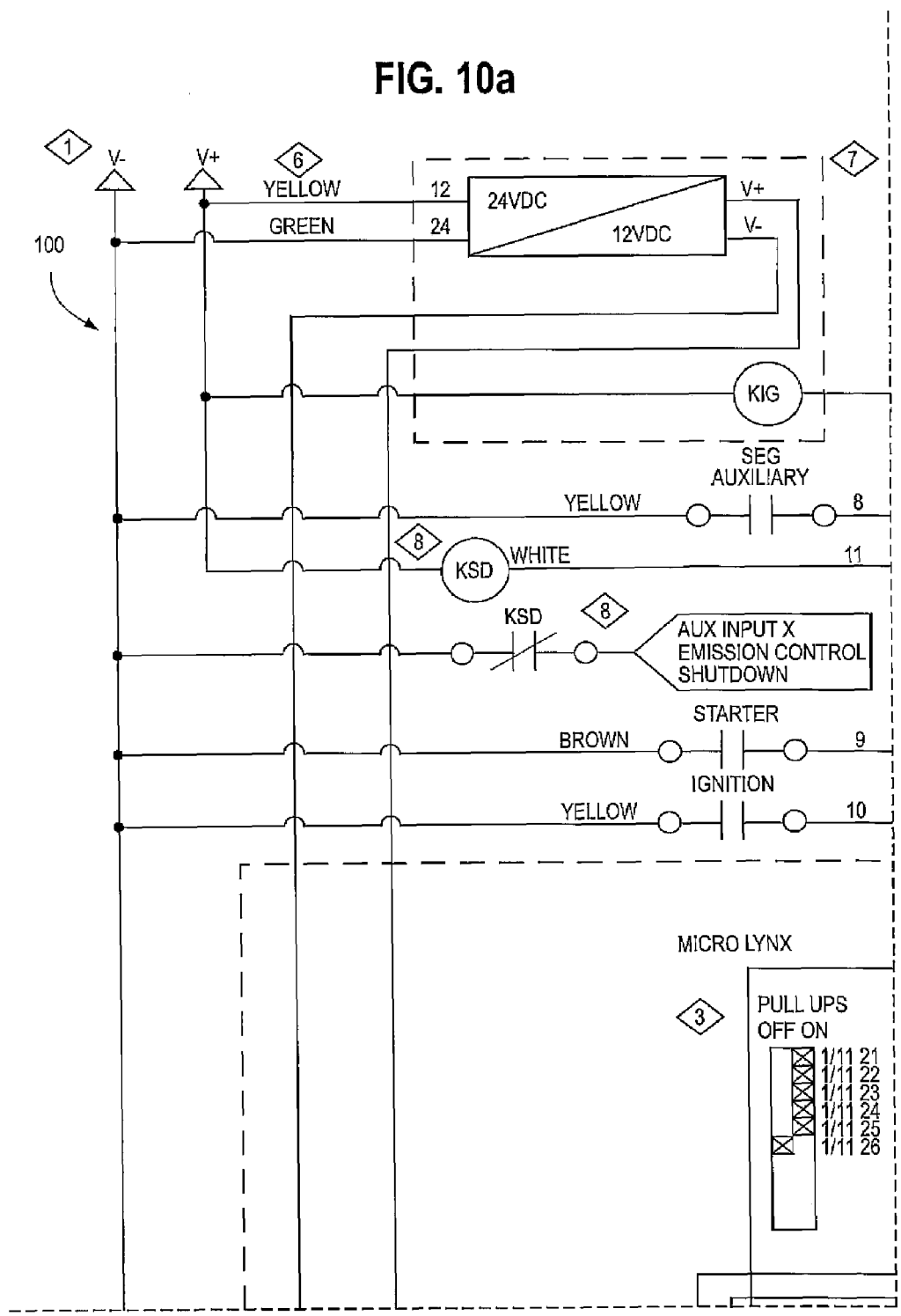
Figure 10B:
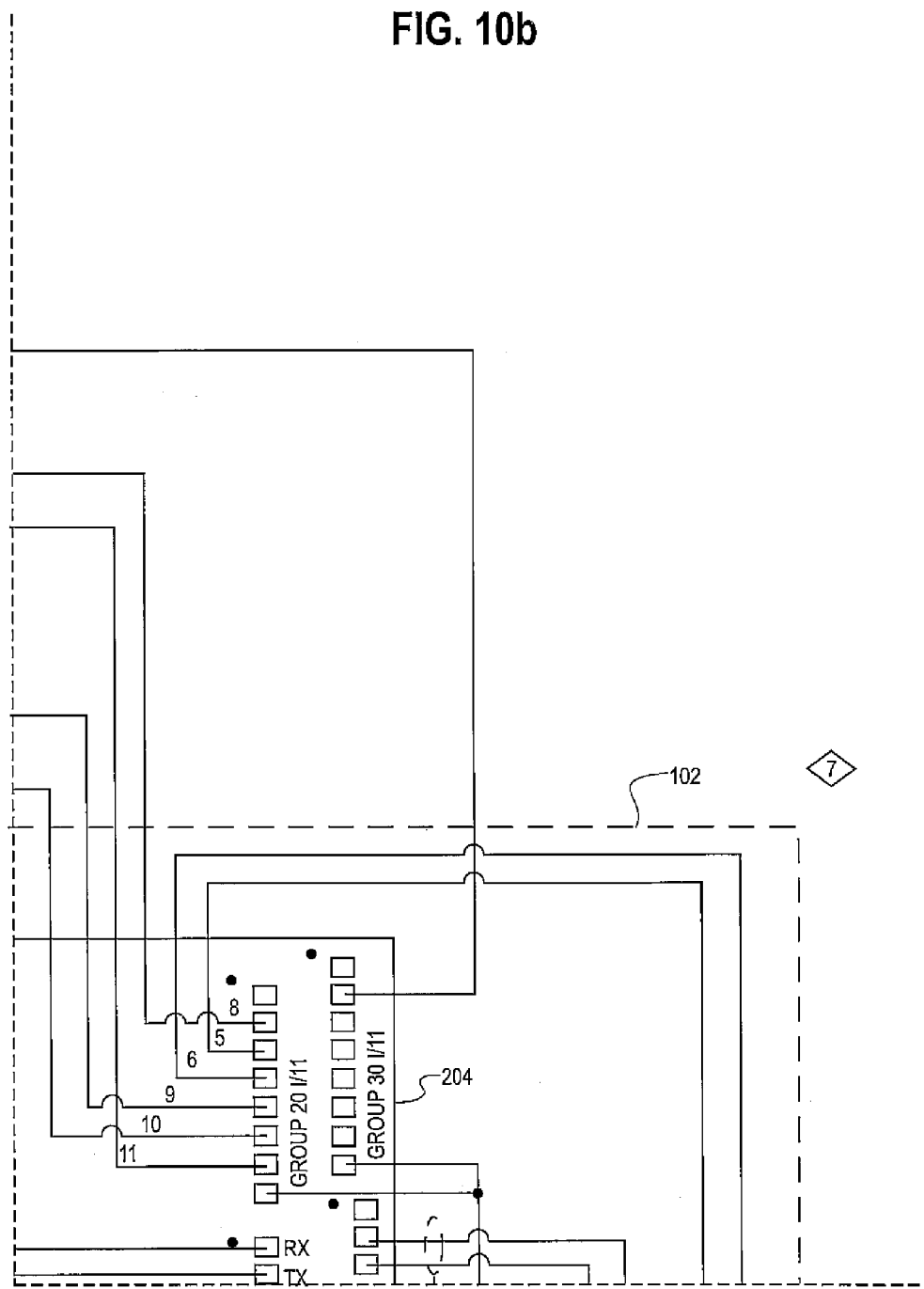
Figure 10C:
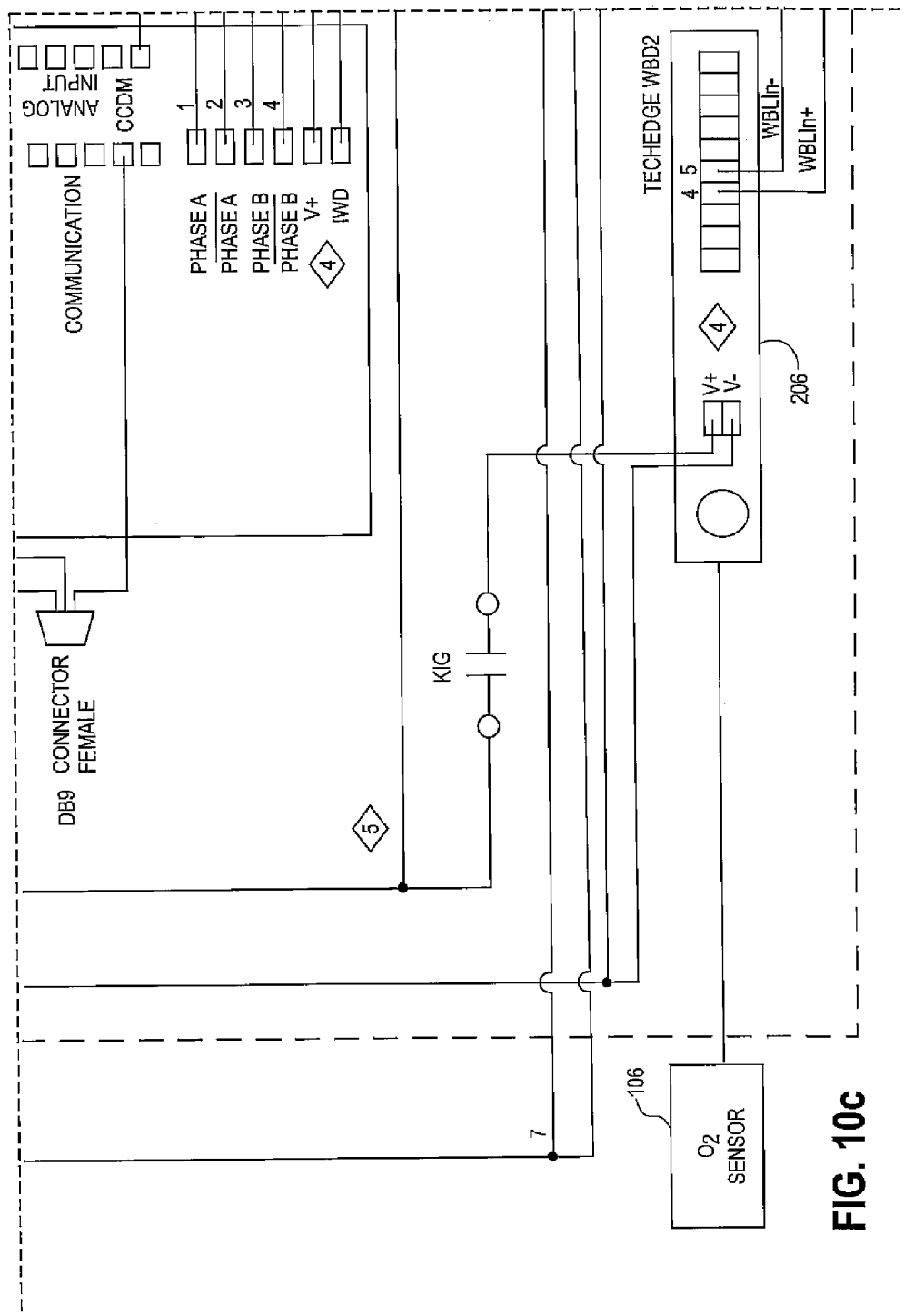
Figure 10D:
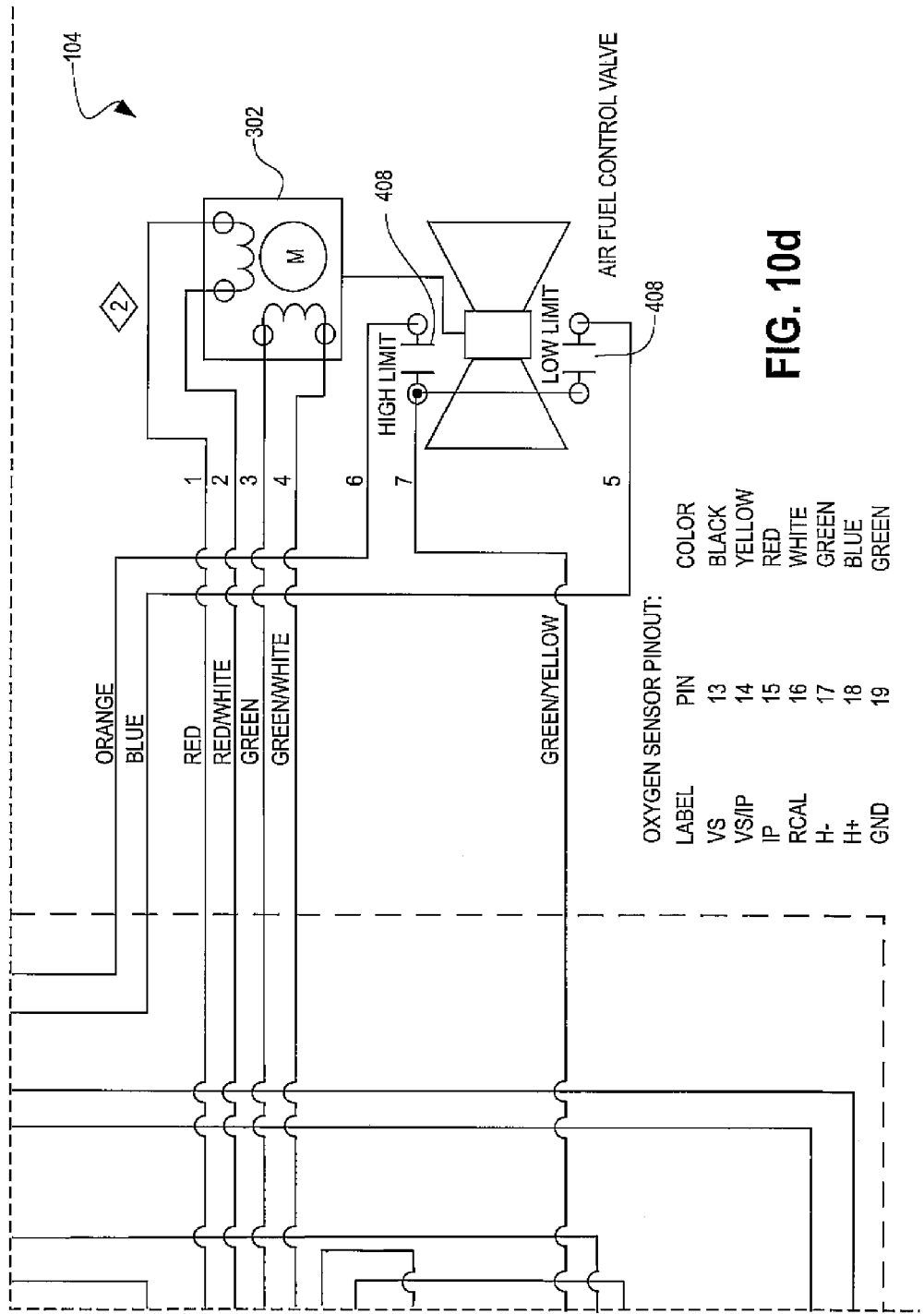

Referring now to FIGS. 2 and 10, there is shown a block diagram and a schematic diagram of the lambda management system 100 showing the lambda management controller 102 in greater detail. The lambda management controller 102 may include a graphical user interface (GUI) 202, a stepper motor controller/driver 204, and a UEGO sensor interface 206. The GUI 202 may allow an operator to view and modify various variables associated with controlling the air/fuel ratio of the engine system. The UEGO sensor interface 206 may convert a signal from the UEGO sensor 106 into an output voltage provided to the stepper motor controller/driver 204 proportional to a measured air/fuel ratio of the gas engine 120. The UEGO sensor interface 206 may also control the heater current to the UEGO sensor 106. The stepper motor controller/driver 204 may utilize the variables from the GUI 202 and the measured air/fuel ratio from the UEGO sensor interface 206 to control the lambda management valve 104.

The stepper motor controller/driver 204 may operate at 12 VDC and include an analog input expansion board and a digital input/output expansion board. The main purpose of the stepper motor controller/driver 204 may be to adjust the air/fuel mixture of the engine via the lambda management valve 104 to a user specified lambda value based on the DC voltage signal provided by the UEGO sensor interface 206. The operator may change and monitor lambda control parameters when connected to the stepper motor controller/driver using the GUI 202. The following external signals may be provided to the stepper motor controller/driver 204: engine operating status on/off, high limit alarm status on/off, and low limit alarm status on/off. Application specific optional input signals may be starter status on/off and ignition status on/off. The controller may also offer connectors to connect wires to the phase inputs of the stepper motor 302.

Figure 9:
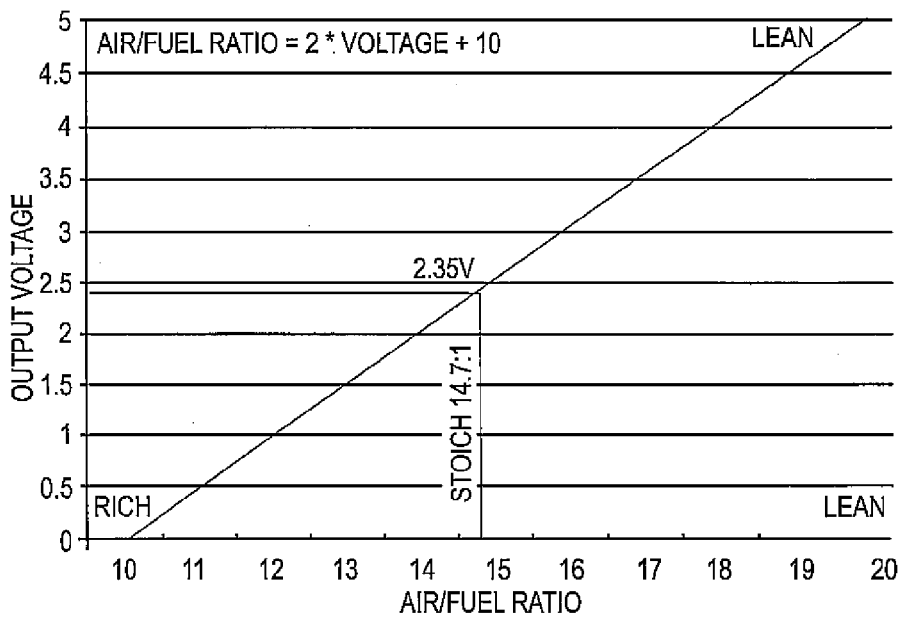
FIG. 9 is a graphical representation of the output response of a UEGO sensor and interface.

The UEGO sensor interface 206 may read the signal produced by the UEGO sensor 106 and turn that signal into a DC voltage signal that correlates directly to the oxygen content in the exhaust stream of an internal combustion engine as shown in FIG. 9. The measured air/fuel ratio may be calculated using the following equation:

$$\text{measured air to fuel ratio} = (2 * DC \text{ voltage signal}) + 10$$

The lambda value may be calculated by simply dividing the measured air/fuel ratio by 14.7 (the stoichiometric air/fuel ratio). If no excess oxygen is present in the exhaust stream the lambda value is 1. The presence of excess oxygen will result in a lambda greater than 1, whereas the absence of excess oxygen is indicated by lambda less than 1. In addition, the UEGO sensor interface 206 may maintain the UEGO sensor 106 at a precise temperature using a feedback loop to obtain the most accurate results and not degrade or damage the sensor over time. The lambda value may be configured to correlate to various oxygen contents. The UEGO sensor interface may be pre-configured to work precisely with the stepper motor controller/driver 204.

Figure 3:
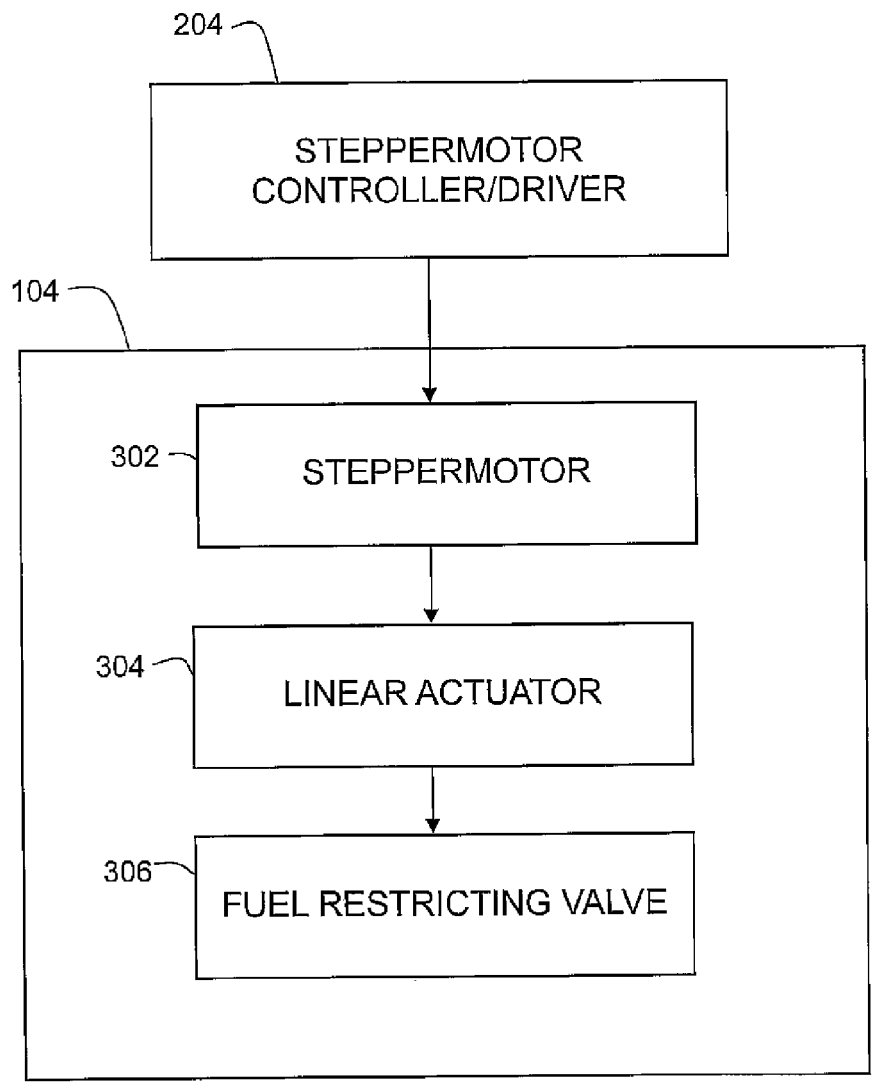
FIG. 3 is a block diagram of the lambda management valve and controller of the lambda management system of FIG. 1.

Referring now to FIGS. 3 and 10, there is shown a block diagram and schematic diagram of the lambda management valve 104 in greater detail. The lambda management valve 104 may include a stepper motor 302, a linear actuator 304, and a fuel restricting valve 306. A signal from the stepper motor controller/driver 204 may drive the stepper motor 302 to move in a clockwise or counter-clockwise rotation. This rotation of the stepper motor 302 may facilitate movement of the linear actuator 304 to change the position of the fuel restricting valve 306 causing an increase or decrease in the flow of fuel through the lambda management valve 104.

The stepper motor 302 may be a standard size NEMA 23, unipolar, linear actuated, 1.8 degree, 3.0 volt, 2-amp stepper motor with 1/4-20-acme thread lead screw @ 0.0005 inches of travel per step. A variation of the lead screw pitch would affect the inches of travel per step. A bipolar motor may be used in place of the stepper motor, which would affect torque and speed of the lambda management valve 104.

Figure 4A:
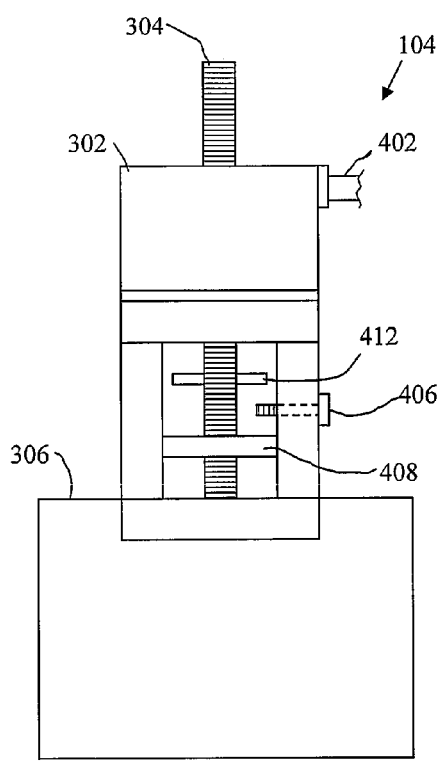
FIG. 4A is side view of the lambda management valve of FIG. 3.
Figure 4B:
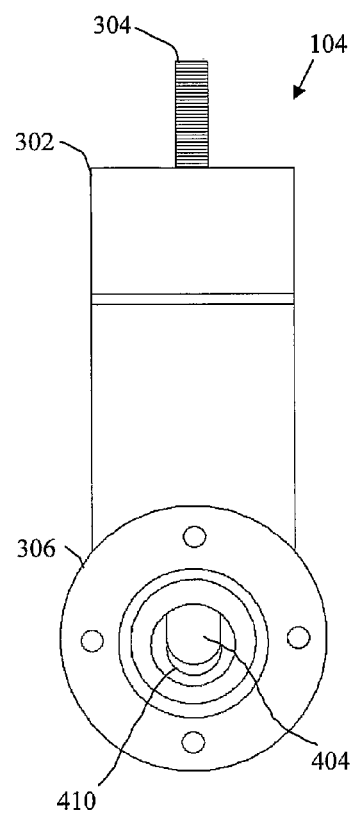
FIG. 4B is an end view of the lambda management valve of FIG. 3.

Referring now to FIGS. 4A and 4B, side and end views of the lambda management valve 104 are shown. The valve 104 may include a main body 306, which may be made of 6065-t56 billet aluminum with a 1-inch diameter hole 410 bored horizontally through the center. The main body 306 may be machined to accept a plunger 404, which may moves up and down vertically, and act as a fuel flow restrictor. The plunger 404 may be operated via the stepper motor 302, which may mount directly to the valve body 306. The plunger 404 may be actuated by the linear motion of the stepper motor lead screw 304. Limit switches 408 may be mounted on either side of the plunger and used for alarm notification, if the valve 104 is either fully opened or fully closed. In addition to that there may be a limit screw 406, which may mechanically stop the movement of the plunger 404 when coming in contact with retainer 412. A wiring harness 402 may provide electrical connections between the lambda management valve 104 and the lambda management controller 102. The valve body 306 and plunger 404 may be manufactured from a variety of different materials and in different sizes.

The GUI 202 may be a Windows based software application allowing the user to modify, monitor and log a number of control parameters within the stepper motor controller/driver 204. The GUI 202 may allow the user to fine tune the lambda management system to their specific needs and may incorporate a real time data screen, a list of set points, and an alarm screen. The GUI 202 may also be reprogrammed to accommodate the specific needs of the user.

Figure 7:
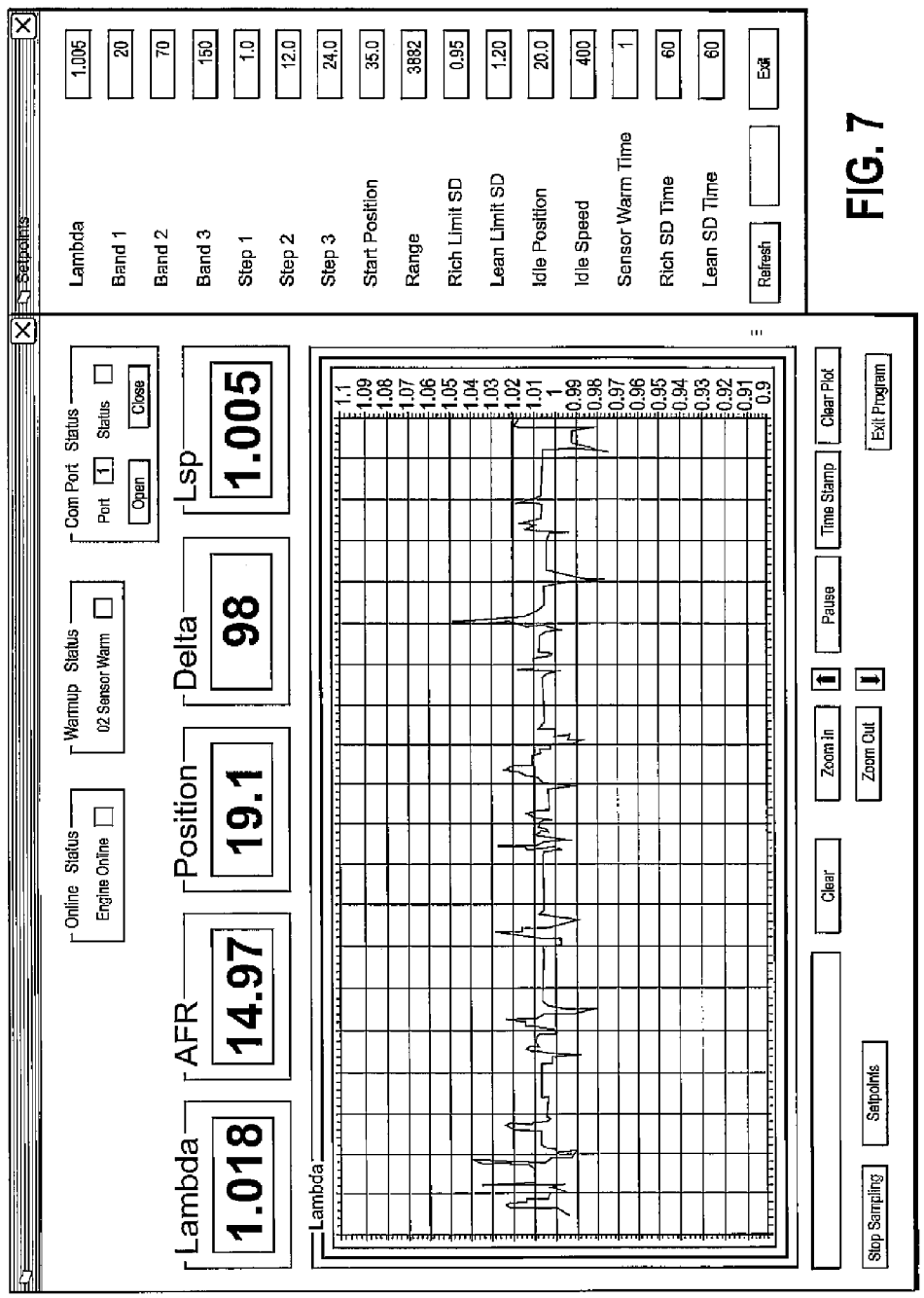
FIG. 7 is an embodiment of the graphical user interface of the lambda management system of FIG. 1.
Figure 8:
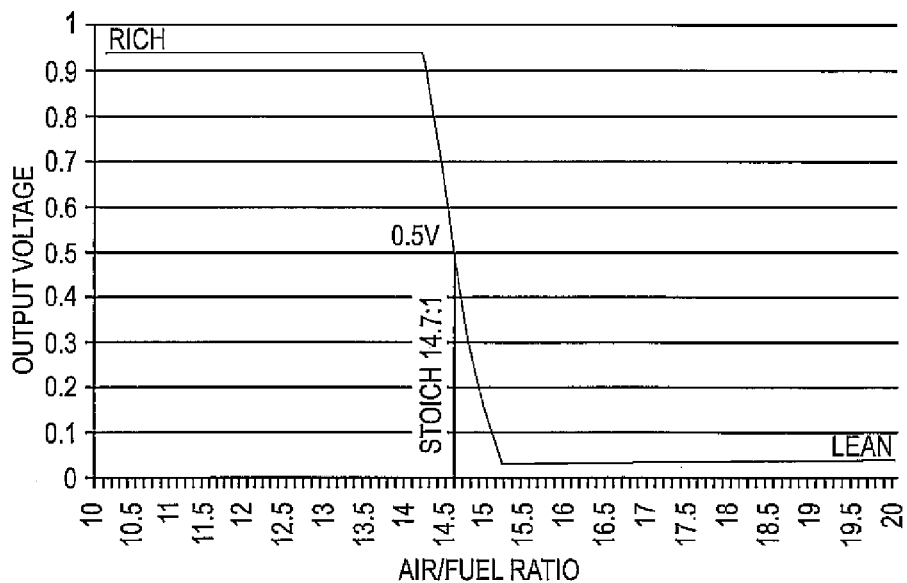
FIG. 8 is a graphical representation of the output response of a HEGO sensor.

The GUI 202 may communicate with the stepper motor controller/driver 204 via a connection from the serial port of a computer running the GUI application to the serial port of the stepper motor controller/driver 204 using a standard RS232 serial cable. Upon launching the GUI-application the main window may be displayed as shown in FIG. 7.

Once the GUI 202 is connected via the serial cable to the stepper motor controller/driver 204, a connection may be established by clicking the "Open" button on the upper right hand side of the main window to open the computer's Com port the stepper motor controller/driver 204 may be connected to. The selected Com port, as shown under the "Com Port Status" above the "Open" button, may be configured to a 9600 bps baud rate, 8 data bits, 1 stop bit, and no parity. If termination of an active connection is desired, the "Close" button next to the "Open" button may be clicked to activate the termination of the connection.

Once a connection is established, the GUI application may automatically start sampling by continuously reading data from the stepper motor controller/driver 204. Sampling may be disabled by activating the "Stop Sampling" button in the lower left hand corner of the main window.

The main portion of the window may be used to plot a time diagram of the lambda value, which may be used for setpoint configuration or simple process monitoring. The following buttons may be provided for user interaction: 1) "Zoom In"—making part of the plot larger; 2) "Zoom Out"—increasing the area of the plot in view; 3) "Pause"—halts the time plot until re-activated; 4) "Time Stamp"—inserts a tag to the current lambda sample showing the recorded time of the sample; 5) "Clear Plot"—clears all the data on the plot leaving an empty plot area.

The upper portion of the GUI's main window indicates the "Online Status" of the gas engine 120 and the "Warmup Status" of the UEGO sensor 106. The engine online condition and the UEGO sensor warm condition may each be signaled by a green indicator.

The following parameters may also be displayed and continuously updated on the upper portion of the GUI's main window: 1) "Lambda"—lambda value as measured by the UEGO sensor; 2) "AFR"—air/fuel ratio derived from the lambda value (air/fuel ratio equals the lambda value times 14.7; 3) "Position"—current lambda management valve 104 position in terms of percent open (0% indicates the valve being fully closed, 100% indicates the valve being fully open); 4) "Delta"—the magnitude of variation between the sampled lambda value and the lambda setpoint (Lsp); and 5) "Lsp"—the desired lambda setpoint the lambda management control system should keep the engine at.

The lower portion of the GUI's main window may display the last occurred alarm message. The previously recorded alarm may be overwritten. Activating the "Clear" button may clear the alarm message currently being displayed leaving an empty field.

Activating the "Setpoints" button at the lower portion of the GUI's window may open a "Setpoints" window on the right side of the window that may allow the user to view, enter, and adjust the initial setpoint parameters. The following setpoints may be modified: 1) "Lambda"—lambda setpoint; 2) "Band1"/"Band2"/"Band3"—delta range values; 3) "Step 1"/"Step 2"/"Step 3"—corrective amount of travel of lambda management valve correlating to Band1/Band2/Band3 values (A step value of 1 may results in a travel of 2/100000" of valve); 4) "Start Position"—lambda management valve opening position in percent on engine start up; 5) "Range"—clicking into this field may initiate a zero setting sequence and display the range value that is needed for displaying valve position accurately (Therefore, a zero setting sequence may be executed after modifying/adjusting the location of the limit switches); 6) "Rich Limit SD"—(SD=shutdown) lambda threshold value at which a rich limit alarm may be displayed and the alarm output activated; 7) "Lean Limit SD—lambda threshold value at which a lean limit alarm may be displayed and the alarm output activated; 8) "Idle Position"—the lambda management valve opening position in percent after the starter has been disengaged; 9) "Idle Speed"—speed value the lambda management valve may travel from the Start to Idle position (minimum number allowed: 1 (slow); maximum value allowed: 500 (fast)); 10) "Sensor Warm Time"—time value in seconds the lambda management valve may be kept at start or idle position to assure accurate reading of the UEGO sensor: 11) "Rich SD Time"—time value in seconds the lambda value may need to continuously fall below the entered rich shutdown value until alarm actions may be executed; and 12) "Lean SD Time"—time value in seconds the lambda value may need to continuously exceed the entered lean shutdown value until alarm actions may be executed.

The Lsp may typically be set at or near 1, but it actually be set to a wide range of lambda values (air/fuel ratios). Due to the linear nature of the output signal of the UEGO sensor interface to the measured lambda value or air/fuel ratio of the exhaust gas of the engine (see FIG. 9), the Lsp may be set to a lambda value of approximately 0.7 to at least 1.4 (air/fuel ratios between 10 and 20). While these alternate settings of the Lsp may not yield the best emissions condition for the engine, other efficiencies of the engine may be satisfied.

Modified parameters may be entered into the reserved space next to their description. To apply the modified parameters the "Enter" button at the bottom of the "Setpoints" window or the Enter key on the computer's keyboard may be clicked/pressed. Activating the "Refresh" button may update all displayed setpoint values to their initial settings. Activating the "Exit" button may close the "Setpoints" window.

In operation the UEGO sensor may be connected to a UEGO sensor interface, which may send a signal to the stepper motor controller/driver that in turn may send an electrical pulse to the stepper motor, which causes the stepper motor to rotate. When the stepper motor rotates, it may cause the lead screw to actuate in a linear motion. The lead screw may be attached to the fuel restrictor (plunger) in the lambda management valve. Moving the fuel restrictor up or open may decrease the restriction on the incoming fuel, and moving the restrictor down or closed may increase restriction on the incoming fuel. While the lambda management system may serve a very specific purpose on an internal combustion engine, some variations might include the use of a servomotor in order to achieve the linear motion of the lambda management valve.

Figure 5:
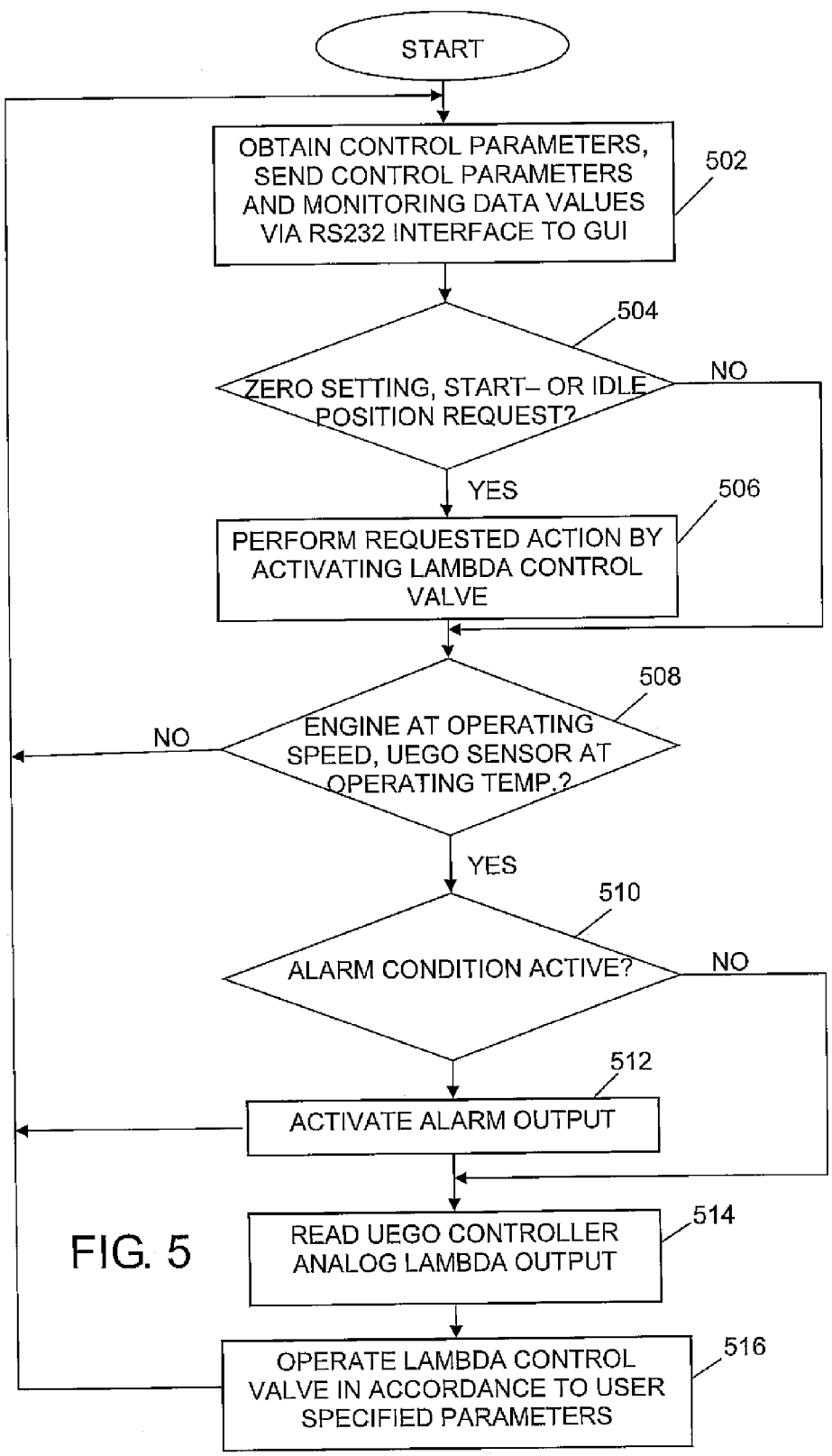
FIG. 5 is a flowchart of an embodiment of a method of controlling the air/fuel ratio using the lambda management system of FIG. 1.

The lambda management system may be designed to control the air/fuel ratio of stationary gaseous-fueled internal combustion engine. The functional flowchart of FIG. 5 shows the control process in more detail. The stepper motor controller/driver may obtain user specified parameters via the GUI 202 when a connection is active and transfer data for monitoring and logging purposes (step 502).

Next, the presence of the following three conditions may be checked at step 504: 1) a zero setting request; 2) a start position request; or 3) an idle position request. A zero setting request may be requested by a user via the GUI. A start position request may be active after supplying power to the controller, when the engine is being stopped or after a user request via the GUI. An idle position request may be active if the engine successfully started and the starter disengaged.

At step 506 the following actions may be performed based on the request: 1) present zero setting request may drive the lambda management valve to a fully open and a fully closed position while the stepper motor controller/driver stores the position results internally to use for precise valve positioning; 2) a start position request may position the lambda management valve to the user specified value; and 3) an idle position request may result in the valve being positioned at the user specified idle position.

A check may be made to see if the engine is running at operating speed and the oxygen sensor is at operating temperature (step 508). Then at step 510 the presence or absence of alarm conditions may be verified. The following four alarm conditions may be active: 1) high-limit and 2) low-limit alarms triggered by limit switches mounted on the plunger of the lambda management valve; 3) rich and 4) lean shutdown alarms triggered if the lambda value obtained from the UEGO sensor interface exceeds the user specified threshold parameters. If an alarm condition is present, the stepper motor controller/driver may drive a digital output to an active low state that can be used for alarm notification or emergency engine shutdown procedures at step 512.

At step 514 the lambda value signal provided by the UEGO sensor interface may be sampled by the stepper motor controller/driver. Based on the value of this signal, the lambda management valve may be operated to a new position according to the user specified parameters at step 516.

Referring now FIG. 6, step 516 will be described in greater detail. The graph of FIG. 6 represents the lambda values sampled in step 514 over a period of time and its variation from the user specified lambda value or Lambda set point (Lsp) as indicated by line 614. Every sampled lambda value may be compared with the Lsp and the delta 610 indicates the magnitude of variation between the sampled lambda value and the Lsp. If the delta value falls into the range of the band1, band2, or band3 values as indicated by lines 616, 618, and 620, respectively, the lambda management valve may be operated as described below. Four different cases may exist.

In case 1, referenced as 602, the delta may be within the band1 values. With the delta within the band1 values 616, the lambda management valve may not be operated and may be maintained at its current position.

In case 2, referenced as 604, the delta may be positive and fall within the band2 values 618, but outside the band1 values 616. Case 2 may indicate a lean air/fuel mixture and more fuel may be provided to the engine to reach the lambda set point goal. The lambda management valve may be operated to open up and allow more fuel to the engine. This opening may be done in user specified step 1 increments. A step value of 1 may result in a lambda management valve travel of 2/100000".

In case 3, referenced as 606, the delta may be negative and fall within band3 values 620, but outside band2 values 618. Case 3 may indicate a rich air/fuel mixture and less fuel may be provided to the engine to reach the lambda set point again. The lambda management valve may be operated to close and allow less fuel to the engine. This closing may be done in user specified step 2 increments, which may be a greater number than the step 1 increments to allow faster travel of the lambda management valve and therefore faster corrective results.

In case 4, reference as 608, the delta may be positive again and fall outside the band3 values 620. Case 4 may indicate a lean air/fuel mixture and more fuel may be provided to the engine to reach the lambda set point again. The lambda management valve may be operated to open up thus allowing more fuel to the engine. This opening may be done in user specified step 3 increments, which may be a greater number than step 1 and step 2 increments to allow faster travel of the lambda management valve and therefore faster corrective results.

Figure 5A:
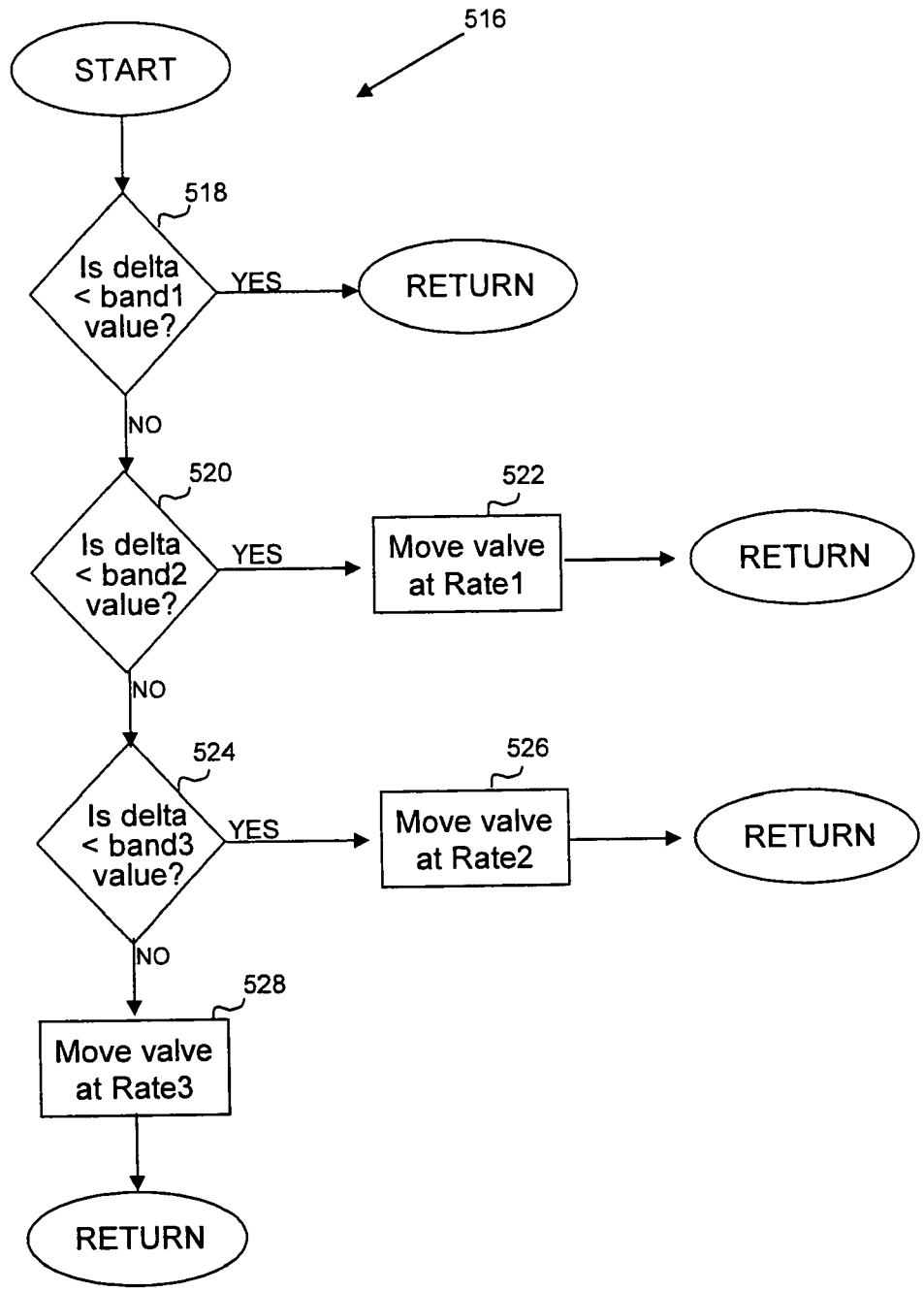
FIG. 5A is a flowchart of the operating step of the method of FIG. 5.

Referring now to FIG. 5A, an embodiment of the operating step 516 is shown. At step 518 the delta may be compared to the band1 value. If the delta is less than the band1 value, the present lambda management valve position may be maintained. If the delta is not less than the band1 value, the delta may be compared to the band2 value at step 520. If the delta is less than the band2 value, the lambda management valve may be commanded to move at a rate1 (step 522). If the delta is not less than the band2 value, the delta may be compared to the band3 value at step 524. If the delta is less than the band3 value, the lambda management valve may be commanded to move at a rate2, which is greater than rate1 (step 526). If the delta is not less than the band3 value, the lambda management valve may be commanded to move at a rate3, which is greater than rate2 (step 528).

With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

While particular embodiments of the present invention have been disclosed, it is to be understood that various different modifications and combinations are possible and are contemplated with the true spirit and scope of the disclosed embodiments. There is no intention, therefore, of limitations to the exact disclosure herein presented.

What is claimed is:

1. A method of controlling a stationary gaseous-fueled internal combustion engine, comprising:
    measuring an air to fuel ratio of the engine;
    calculating a difference between the measured air to fuel ratio and a desired air to fuel ratio for the engine; and
    automatically controlling an air to fuel mixture supplied to the engine in accordance with the calculated difference to enable the engine to run at substantially the desired air to fuel ratio,
    wherein measuring the air to fuel ratio utilizes a wideband oxygen sensor,
    wherein measuring the air to fuel ratio includes utilizing a wideband oxygen sensor interface electrically connected to the wideband oxygen sensor,
    wherein the wideband oxygen sensor interface provides an output voltage proportional to the measured air to fuel ratio according to the following equation:

measured air to fuel ratio=(2*output voltage)+10.

2. A method of controlling a stationary gaseous-fueled internal combustion engine, comprising:
    measuring an air to fuel ratio of the engine;
    calculating a difference between the measured air to fuel ratio and a desired air to fuel ratio for the engine; and
    automatically controlling an air to fuel mixture supplied to the engine in accordance with the calculated difference to enable the engine to run at substantially the desired air to fuel ratio,
    wherein automatically controlling the air to fuel mixture includes comparing the difference with at least one threshold band,
    wherein the at least one threshold band includes a first threshold band, a second threshold band, and a third threshold band.

3. The method of claim 2, wherein the air to fuel mixture is not adjusted if the difference is within the first threshold band.

4. The method of claim 2, wherein the air to fuel mixture is adjusted at a first rate if the calculated difference is outside the first threshold band and within the second threshold band.

5. The method of claim 4, wherein the air to fuel mixture is adjusted at a second rate if the calculated difference is outside the second threshold band and within the third threshold band, the second rate being greater than the first rate.

6. The method of claim 5, wherein the air to fuel mixture is adjusted at a third rate if the calculated difference is outside the third threshold band, the third rate being greater than the second rate.

7. The method of claim 2, wherein the air to fuel mixture is adjusted to increase the flow of fuel to the engine if the calculated difference is positive and outside the first threshold band.

8. The method of claim 2, wherein the air to fuel mixture is adjusted to decrease the flow of fuel to the engine if the calculated difference is negative and outside the first threshold band.

9. The method of claim 2, further comprising:
    setting the threshold bands through a graphical user interface.

10. A method of controlling a stationary gaseous-fueled internal combustion engine, comprising:
    measuring an air to fuel ratio of the engine;
    calculating a lambda value using the measured air to fuel ratio;
    calculating a difference between the calculated lambda value and a lambda set point for the engine; and
    automatically controlling an air to fuel mixture supplied to the engine in accordance with the calculated difference to enable the engine to run at substantially the desired air to fuel ratio,
    wherein measuring the air to fuel ratio utilizes a wideband oxygen sensor,
    wherein measuring the air to fuel ratio includes utilizing a wideband oxygen sensor interface electrically connected to the wideband oxygen sensor,
    wherein the wideband oxygen sensor interface provides an output voltage proportional to the measured air to fuel ratio according to the following equation:

measured air to fuel ratio=(2*output voltage)+10.

11. A method of controlling a stationary gaseous-fueled internal combustion engine, comprising:
    measuring an air to fuel ratio of the engine;
    calculating a lambda value using the measured air to fuel ratio;
    calculating a difference between the calculated lambda value and a lambda set point for the engine; and
    automatically controlling an air to fuel mixture supplied to the engine in accordance with the calculated difference to enable the engine to run at substantially the desired air to fuel ratio,
    wherein automatically controlling the air to fuel mixture includes comparing the difference with at least one threshold band,
    wherein the at least one threshold band includes a first threshold band, a second threshold band, and a third threshold band.

12. The method of claim 11, wherein the air to fuel mixture is not adjusted if the difference is within the first threshold band.

13. The method of claim 11, wherein the air to fuel mixture is adjusted at a first rate if the calculated difference is outside the first threshold band and within the second threshold band.

14. The method of claim 13, wherein the air to fuel mixture is adjusted at a second rate if the calculated difference is outside the second threshold band and within the third threshold band, the second rate being greater than the first rate.

15. The method of claim 14, wherein the air to fuel mixture is adjusted at a third rate if the calculated difference is outside the third threshold band, the third rate being greater than the second rate.

16. The method of claim 11, wherein the air to fuel mixture is adjusted to increase the flow of fuel to the engine if the calculated difference is positive and outside the first threshold band.

17. The method of claim 11, wherein the air to fuel mixture is adjusted to decrease the flow of fuel to the engine if the calculated difference is negative and outside the first threshold band.

18. The method of claim 11, further comprising:
    setting the threshold bands through a graphical user interface.

* * * * *